(12) United States Patent
Eadie

(10) Patent No.: US 7,316,691 B2
(45) Date of Patent: Jan. 8, 2008

(54) ANIMAL TAG APPLICATOR

(75) Inventor: Brian Eadie, Selkirk (GB)

(73) Assignee: Allflex Europe (UK) Limited, Scotland (GB)

(*) Notice: Subject to any disclaimer, the term of this patent is extended or adjusted under 35 U.S.C. 154(b) by 467 days.

(21) Appl. No.: 10/381,240

(22) PCT Filed: Sep. 21, 2001

(86) PCT No.: PCT/GB01/04219

§ 371 (c)(1),
(2), (4) Date: Sep. 2, 2003

(87) PCT Pub. No.: WO02/23980

PCT Pub. Date: Mar. 28, 2002

(65) Prior Publication Data

US 2004/0092954 A1    May 13, 2004

(51) Int. Cl.
A61B 17/00    (2006.01)
(52) U.S. Cl. .................................... 606/117
(58) Field of Classification Search ............. 606/117, 606/188; 604/61; 600/201; 40/300, 301; 227/67
See application file for complete search history.

(56) References Cited

U.S. PATENT DOCUMENTS

| 3,893,612 | A | * | 7/1975 | Bone ........................... 227/67 |
| 4,470,212 | A | | 9/1984 | Stafford ........................ 40/301 |
| 4,511,073 | A | * | 4/1985 | Furutsu ........................ 227/67 |
| 4,969,589 | A | * | 11/1990 | Kim ............................ 227/67 |
| 5,234,440 | A | * | 8/1993 | Cohr .......................... 606/117 |
| 5,423,470 | A | * | 6/1995 | Kawada ....................... 227/67 |

FOREIGN PATENT DOCUMENTS

| EP | 0 482 902 | | 4/1992 |
| GB | 161270 | | 4/1921 |
| GB | 675315 | | 7/1952 |
| GB | 2055670 | | 3/1981 |
| GB | 2276112 | | 9/1994 |
| NL | 1008307 | | 8/1999 |
| NZ | BG 2055670 A | * | 8/1980 |

* cited by examiner

Primary Examiner—Anhtuan T. Nguyen
Assistant Examiner—Tuan Van Nguyen
(74) Attorney, Agent, or Firm—Drinker Biddle & Reath LLP

(57) ABSTRACT

An animal tag application apparatus is provided which comprises a body (1) and a pivoting lever (2). The lever (2) has attached thereto a push rod (3) and actuating member (4) which act as the operating means for both the applicator jaws which apply the tag (8) to the animal and a tag delivery means which pushes subsequent tags into the jaws. The delivery means comprises a toothed gear wheel (11) that is acted upon by ratchet mechanism to rotate the wheel and hence push the tags into the applicator jaws. A guide may also be provided to ensure smooth movement of the tags under the action of the delivery means. Thus, the operating means of the apparatus operates both the application of the tag and the delivery of the subsequent tag from a single operation of the lever (2). Tags adapted for use the apparatus are also disclosed.

9 Claims, 4 Drawing Sheets

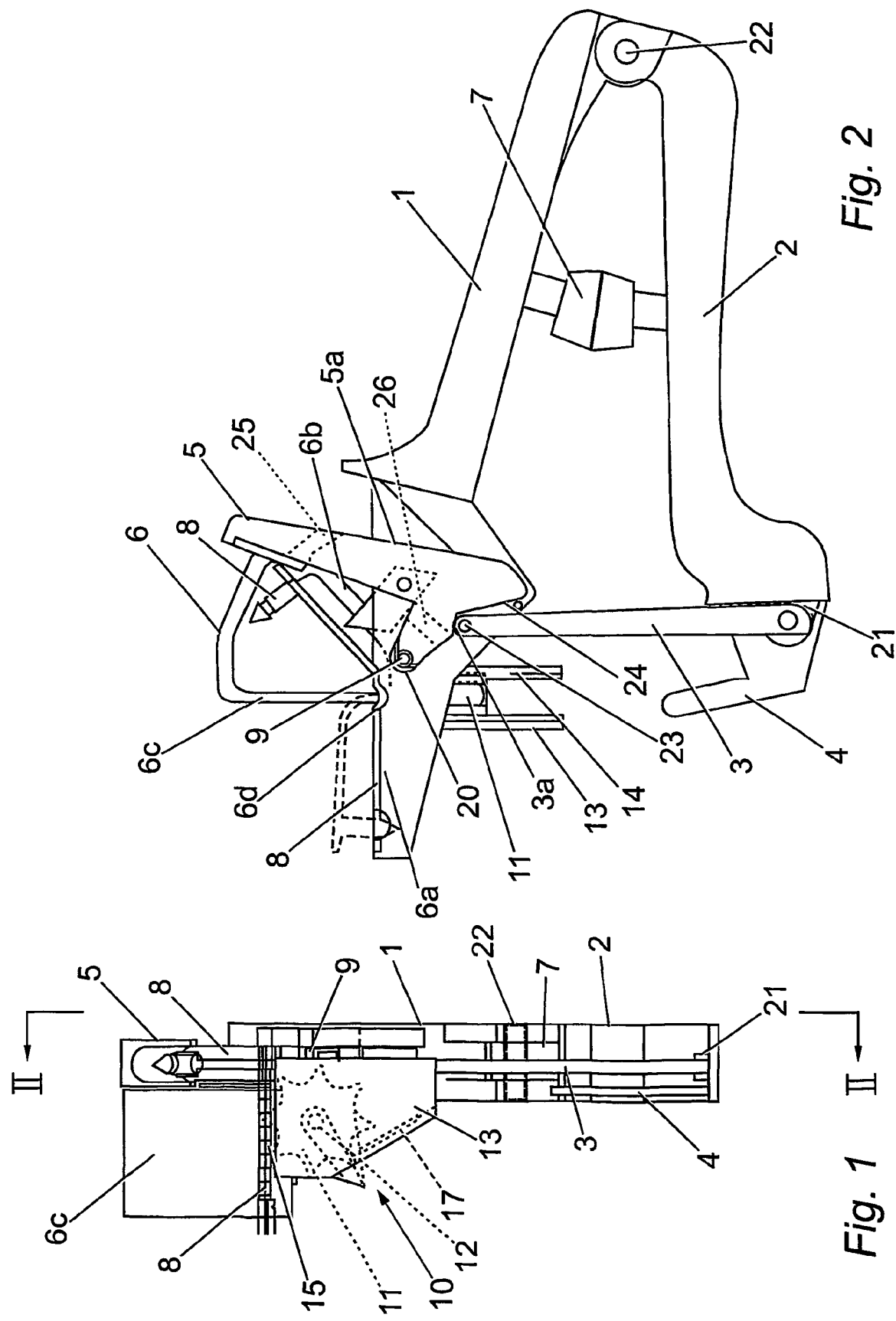

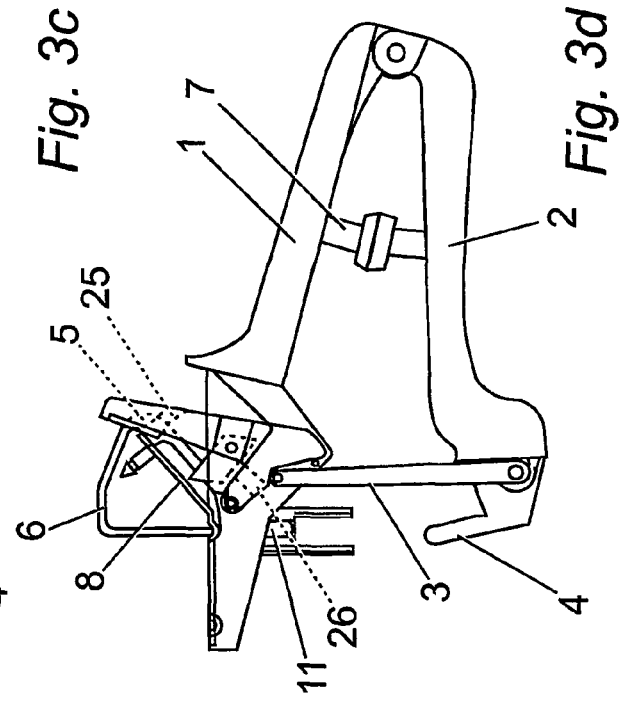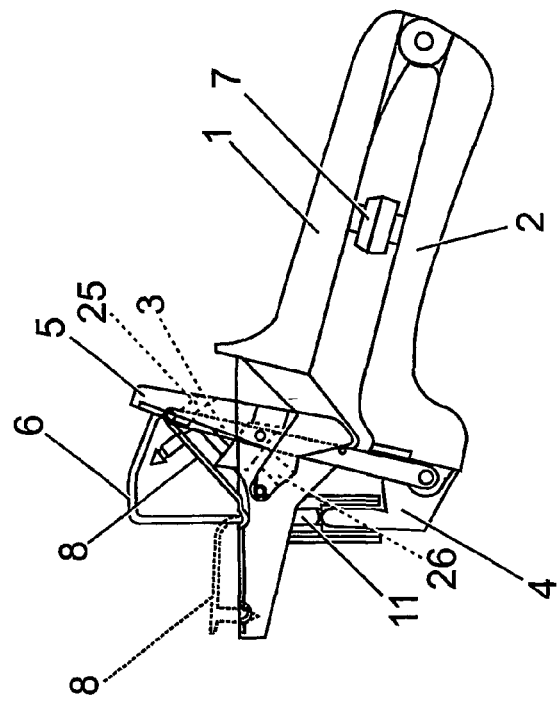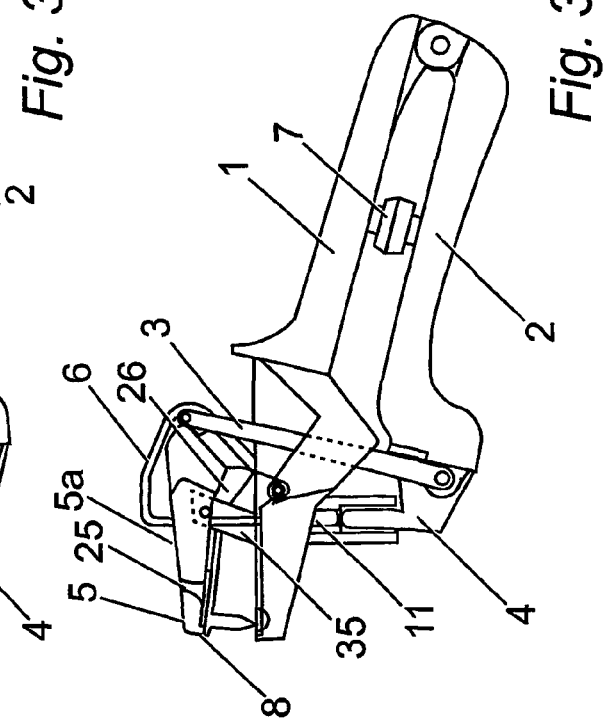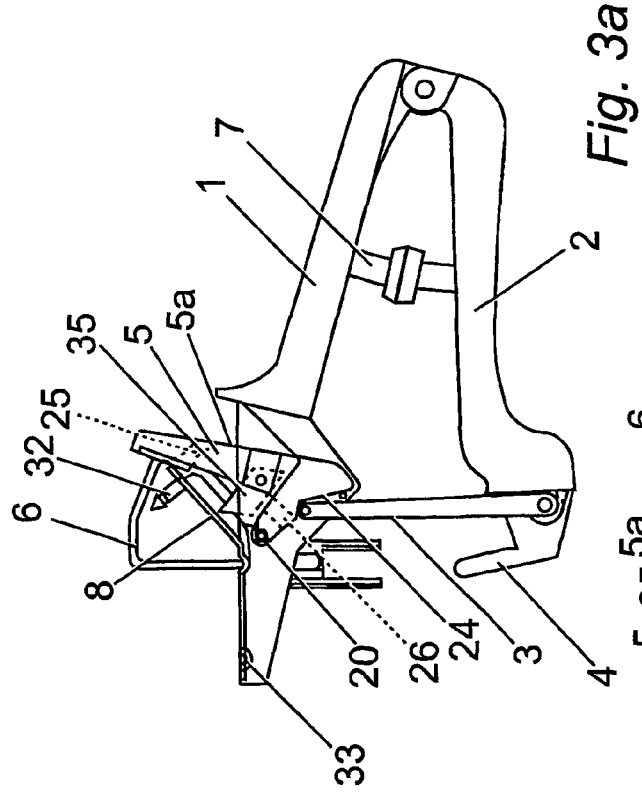

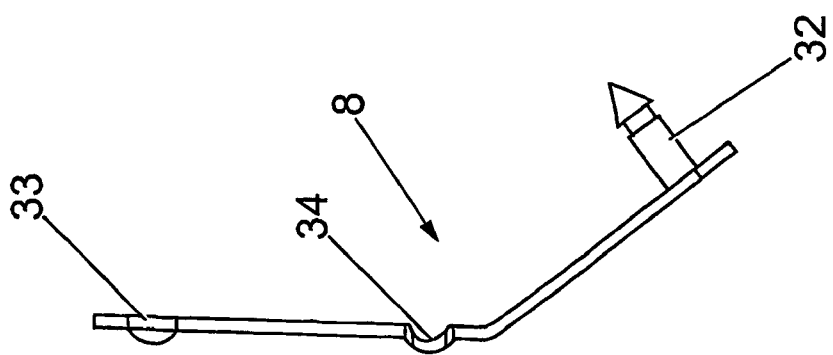
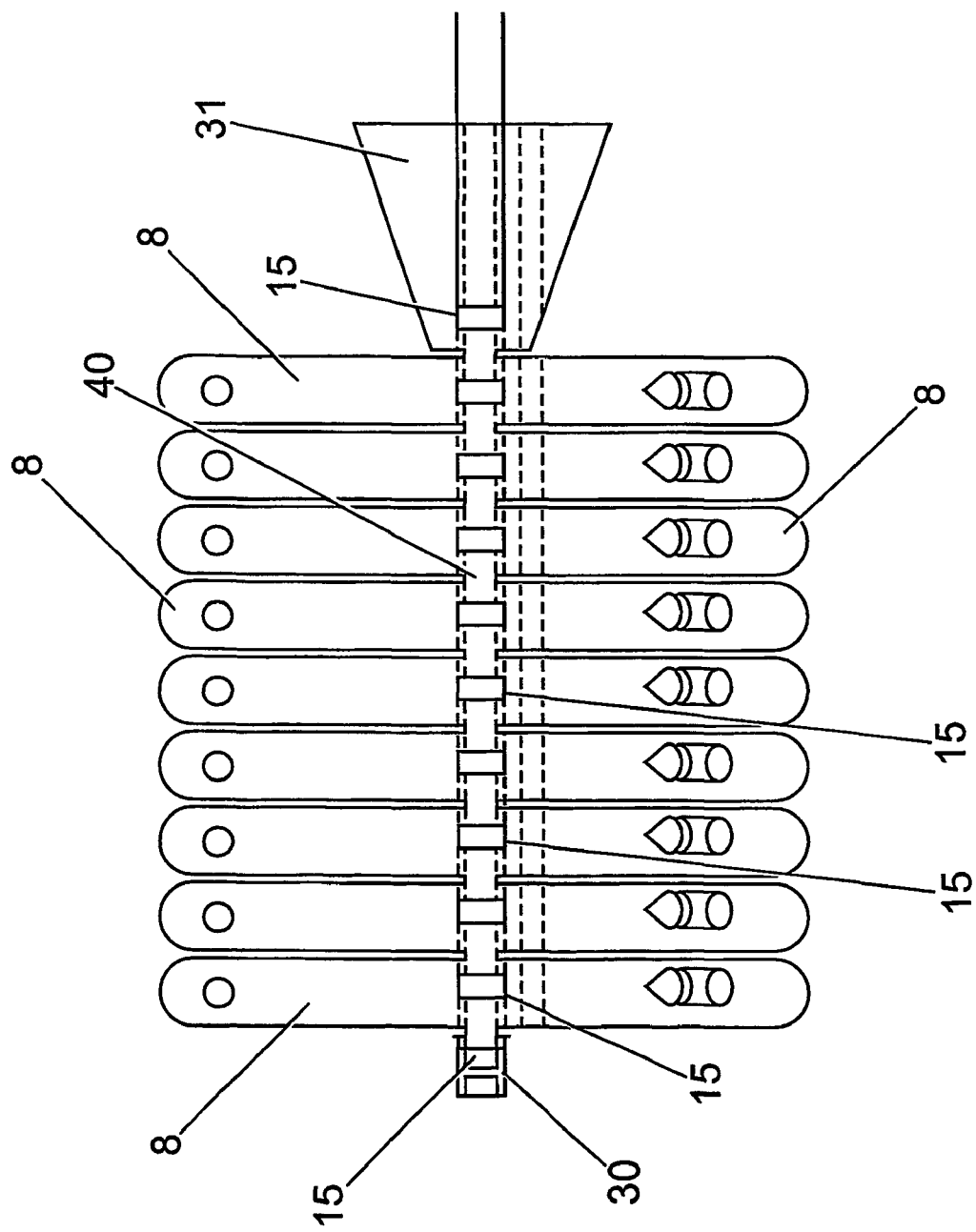

ANIMAL TAG APPLICATOR

The present invention relates to an apparatus for attaching identification tags to animals.

The use of tags on animals for identification purposes has been known for many years. It is also known that the best manner of applying such tags so that they cannot fall off or else be removed by the animal is by fixing them directly to the animal. The part of many animals that is most suited for such attachment is the ear, as the flesh of the ear is relatively thin and the animal feels little or no pain when the tag is attached.

Tag applicators that apply individual tags are known. In addition, there exist tag applicators that receive a number of tags at a time for application. However, such multiple tag applicators have a number of drawbacks. Firstly, the individual tags are commonly loaded within a spring-biased delivery system so that they may be pushed into the jaws of the applicator one after another. The tags are usually provided moulded in packs of five or ten, and in order to be loaded into the applicator they must first be separated and then loaded individually. However, the delivery of the individual tags into the applicator jaws can be disrupted, as the force of the biasing spring can force tags to eject from the delivery mechanism or else get jammed before successfully entering the applicator jaws. A further disadvantage of the spring-loaded system is that the replacement of tag magazines can be time consuming.

Known tag applicators have also been unable to provide sufficient force in the jaw mechanism for the tags to pierce an animal's ear quickly and cleanly. The operators of such applicators have had to struggle to apply the tag whilst also holding on to the animal. An applicator which amplified the force applied by the operator to the applicator jaws would obviate such a problem.

Therefore, it is an aim of the present invention to provide an apparatus for the application of multiple animal identification tags without disruption to the delivery of tags or additional time being taken to introduce a new set of tags. It is a further aim of the present invention to provide an apparatus for the application of multiple animal identification tags that can feed tags into the apparatus and apply said tags through a single operation by the operator.

According to a first aspect of the present invention, there is provided an apparatus for the application of identification tags to animals, said apparatus comprising a body, tag application means, delivery means for the delivery of two or more of said tags into said tag application means, and operating means for the operation of said apparatus, wherein said operating means is adapted to operate both said tag application means and delivery means, and wherein the tag application means has a driving surface adapted to engage a tag and drive the tag into a portion of the animal.

Preferably, the operating means operates said tag application means and delivery means in sequence, such that a subsequent tag is delivered into the application means automatically following application of a first tag.

Preferably, said tag application means comprises a hammer member pivotably attached to said body, said hammer member having a surface adapted to be acted upon by said operating means. Preferably, said surface is a cam surface.

Preferably, the cam surface is arranged so that the initial velocity of said driving surface is greater than the final velocity of said driving surface.

Preferably, said hammer is adapted to move from a first position to a second position under the action of said operating means. Preferably, said hammer is provided with a first biasing means so that it can return to said first position from said second position when said operating means ceases to act upon said hammer.

Preferably, the two or more tags are interconnected, and said hammer further comprises a cutting blade adapted to separate a tag in said tag application means from the or each remaining tag in said guide means as the tag application means is operated.

Preferably, said operating means comprises a lever member pivotably attached to said body and moveable between a first position and a second position. Preferably, said lever is biased to said first position by a second biasing means connected between said lever and said body, said first position being further from said body than said second position.

Preferably, said apparatus further comprises guide means adapted to guide said two or more tags to a position adjacent said tag application means.

Preferably, said delivery means includes a rotatable gear wheel having a plurality of teeth, said gear wheel positioned adjacent said tag application means so as to effect movement of said two or more tags into said application means when acted upon by said operating means. Preferably, said delivery means further includes a ratchet mechanism adapted to communicate the movement of the operating means to the gear wheel.

Preferably, said loading means is automatically operated by said operating means.

According to a second aspect of the present invention, there is provided an identification tag comprising first and second body portions interconnected by a web portion, said first body portion having piercing means thereon and said second body portion having a corresponding aperture therein for receipt of said piercing means, wherein said first body portion further comprises a lateral crease line, said tag being bent about said crease line such that said first body portion lies at an angle to said second portion.

Preferably the angle between said first and second body portions is between 90 and 170 degrees. Most preferably, said angle is between 120 and 150 degrees.

Preferably, said tag is provided with a locating means. Preferably, said locating means is a lateral groove in said web portion.

Preferably, said tag is moulded. Most preferably, the tag is moulded as part of a set of tags, each of the individual tags being interconnected by a moulded spine portion.

A preferred embodiment of the present invention will now be described, by way of example only, with reference to the accompanying drawings, wherein:

FIG. 1 shows an end elevation view of an animal tag applicator in accordance with the first aspect of the present invention;

FIG. 2 shows a side elevation of the applicator of FIG. 1;

Figure 4:
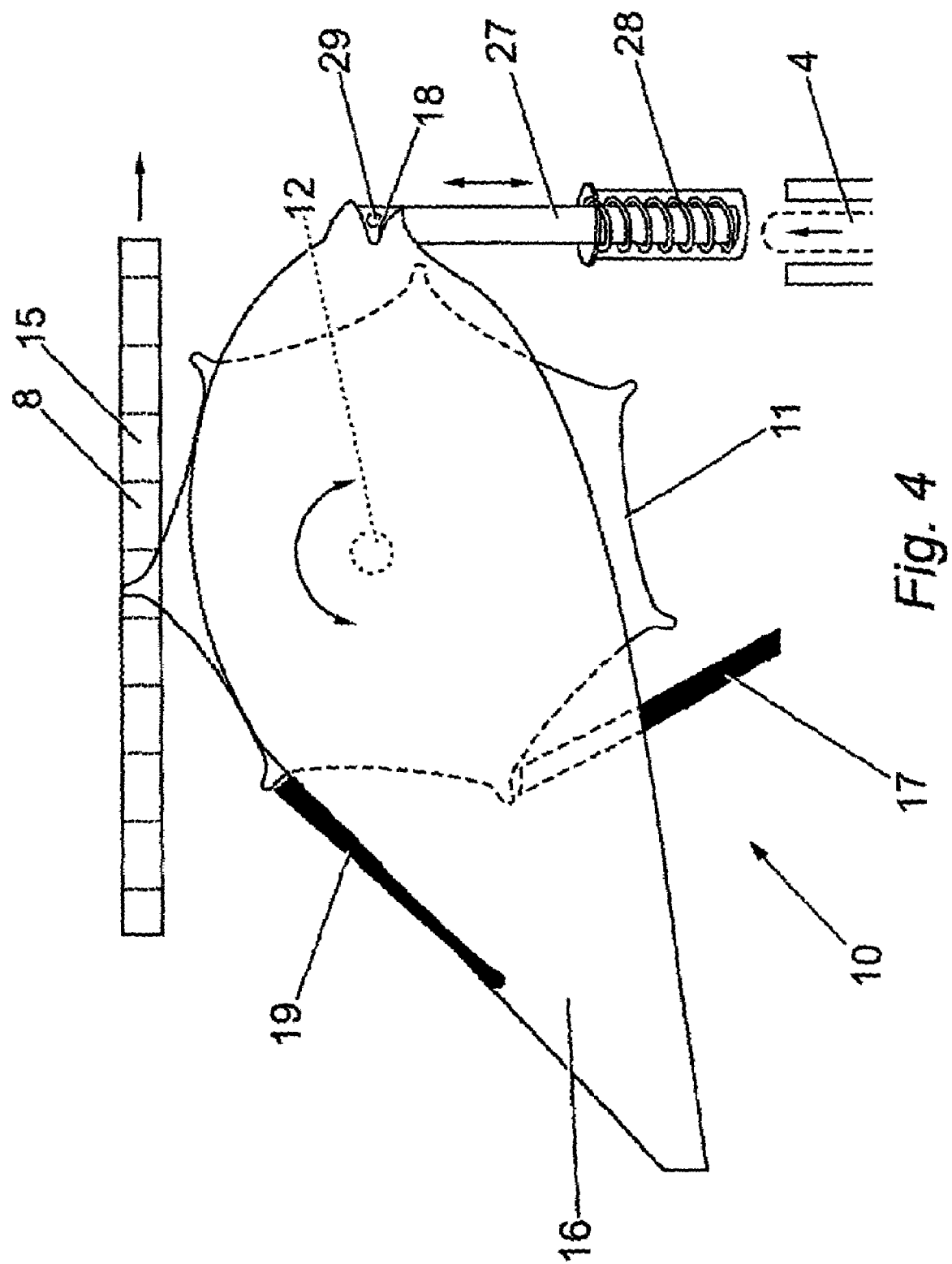

FIGS. 3(a)-(d) show side elevation views of the applicator of FIGS. 1 and 2 in during one operation cycle;

FIG. 4 is a detail view of a tag delivery mechanism which forms part of the present invention;

FIG. 5 shows a plan view of a tag cartridge for use with the present invention; and FIG. 6 shows a side elevation of a tag in accordance with the second aspect of the present invention.

FIGS. 1 and 2 show a preferred embodiment of the animal tag applicator. The applicator comprises a body 1 and an operating means comprising a lever 2 that is attached to the body 1 by a pivot pin 22. The lever 2 and body 1 are also attached together by a volute spring 7 that biases the lever 2 away from the body 1. The opposite end of the lever 2 from the pivot pin 22 has attached thereto a push rod 3 and an actuation member 4. The push rod 3 is connected to the lever 2 by a sprung hinge 21 which extends through the push rod 3 and lever 2 and allows the push rod 3 to pivot with respect to the lever 2. The push rod 3 has lobe portions 23 on either side thereof.

The applicator also includes tag application means comprising a hammer member 5 that is hinged to the body 1 about a hinge pin 9 and torsion spring 20. The hammer member 5 acts as the upper jaw of the application means, with a portion of the body 1 acting as the fixed lower jaw. The hammer 5 is provided with a cam surface 24 on the rear of the hammer 5 that is engaged by the tip 3a of the push rod 3. For reasons which will be explained below, the cam surface 24 is shaped so that the hammer 5 has an initial velocity which is quicker than its final velocity. The torsion spring 20 ensures that the hammer 5 returns to its open position once the rod 3 reaches the end of the cam surface 24.

The hammer 5 is provided with a slot (not shown) which extends around the cam surface 24 and upper surface 5a of the hammer 5 between a pair of channels 25,26. The slot is sufficiently wide to accept the tip 3a of the push rod 3. However, the slot is not wide enough to permit the lobes 23 of the push rod 3 to pass through. The slot therefore guides the push rod tip 3a along the cam surface 24 and then along the upper surface 5a of the hammer 5 as the hammer 5 returns to its open position under the force of the torsion spring 20. Each end of the slot connects with a channel 25,26 which is wide enough to allow the lobes 23 of the push rod 3 to pass through. One channel 26 is provided on the stem of the hammer 5. The channels 25,26 permit the push rod 3 to return to its rest position through the hammer 5 as the hammer 5 returns to its open position.

The multiple tag delivery means of the applicator is seen best in FIGS. 1 and 4. The applicator is provided with a guide component 6 which is fixed to the body 1 and has three principal portions: a base portion 6a attached to the jaw portion of the body 1 and into which a magazine of moulded tags 8 is loaded, a support portion 6b which supports the tags 8 once loaded, and a locating portion 6c which ensures that the tags 8 are loaded correctly. The guide 6 is formed as one piece and is looped so that the locating portion 6c corresponds to a groove 6d in the base portion 6a. In this way, the tags 8 can slide between the base portion 6a and the locating portion 6c but cannot fall out of the applicator.

The delivery of the tags 8 to the jaws of the applicator is effected by a gear wheel mechanism, generally designated 10. The mechanism 10 comprises a gear wheel 11 which is rotatably held on a spindle 12 between a pair of plate members 13,14 which are fixed to the body of the applicator so that the gear wheel 11 is substantially perpendicular to the body 1. The gear wheel 11 is positioned so that it is directly below the locating portion 6c of the tag guide 6. Thus, when the gear wheel 11 rotates, the teeth of the wheel 11 enter corresponding apertures 15 formed in or between each of the tags 8 lying in the guide 6, thus pushing the tags 8 towards the jaws of the applicator. A ratchet member 17 is provided on the body 1 to ensure that the gear wheel 11 may only push the tags 8 towards the jaws of the applicator.

The operation of the delivery means can be seen best in FIG. 4, in which, for the purposes of clarity, the plate members 13,14 are not shown. In addition, it should be noted that any references herein to clockwise and anti-clockwise rotation are in respect of the view shown in FIG. 4.

Positioned between the first plate 13 and the gear wheel 11 is an elliptical plate 16 which is rotatably held on the same spindle 12 that holds the gear wheel 11. At one end of the plate 16 is provided a notch 18 whilst at the other end of the plate is a further ratchet member 19. The body 1 has a substantially vertical bore in which is located a pin member 27 which is biased by a spring 28. The pin 27 has a lobe 29 which is located in the notch 18 of the plate 16. As the pin 27 can slide up and down within the bore, the lobe 29 acts upon the notch 18, thereby causing rotation of the plate 16 about the spindle 12. As the pin 27 rises, the plate 16 is caused to rotate anti-clockwise. As the plate 16 rotates anti-clockwise, the ratchet member 19 moves anti-clockwise over one or more teeth of the gear wheel 11. When the pin 27 has risen to its maximum travel and begins to return down the bore, the downward motion of the lobe 29 will act on the notch 18 and the plate 16 will rotate clockwise. As the plate 16 rotates clockwise, the ratchet member 19 will rotate and act upon a tooth of the gear wheel 11, pushing the tooth clockwise and thereby rotating the gear wheel 11 and pushing the tags 8 towards the jaws of the applicator.

The tags 8 to be used with the present invention are shown in FIGS. 5 and 6. The tags 8 are made of moulded plastic and are moulded together in sets as shown in FIG. 5. The set of tags are moulded together with a spine 40 so that the tags 8 are secured together until they are to be separated one after another upon entering the jaws of the applicator. In the centre of each tag 8 is an aperture 15 which permits the teeth of the gear wheel 11 to move the tags 8 as previously described. Alternatively, apertures to be engaged by the teeth of the gear wheel could be formed between adjacent tags. In addition, each set of tags may have a "dummy tag" portion 30 so that the gear wheel 11 can load the tags 8 correctly. If the dummy tag 30 was not provided, the teeth of the gear wheel 11 would not be able to push the tags 8 into the applicator. As an option, the tags 8 may also be provided with a tab 31 which could, for example, be printed with instructions on how to use the tags.

The preferred shape of the tags 8 is shown in FIG. 6. As can be seen, each tag 8 is provided with a sharp point 32 at one end and a corresponding aperture 33 at the other end. The tag 8 also has a groove 34 extending laterally across the centre portion of the tag 8. This groove 34 corresponds with the groove 6d in the base portion 6a of the guide 6. The locating portion 6c of the guide abuts the groove 34 of the tag 8 thus holding the tag 8 in the correct position in the groove 6d of the base portion 6a of the guide. The tag 8 in this particular embodiment is also bent across a crease line adjacent the centre thereof so that the portion of the tag 8 containing the point 32 is at approximately 45 degrees to the horizontal. This shaping of the tag 8 prior to use reduces the amount of force required to fit the tag 8 to an animal. The apertures to be engaged by the teeth of the gear wheel are preferably formed at or adjacent to the crease line, but could be formed elsewhere along the lengths of the tags.

The operation of the applicator will now be described, in particular with reference to FIGS. 3(a)-(d), as these figures show the various stages of the application process. FIG. 3(a) shows the applicator prior to being operated. At this stage, the tags 8 have been loaded, the dummy tag 30 has been removed by the applicator and the first tag is located in the applicator jaws. As the operator closes the lever 2 in the direction of the body 1, the push rod 3 rises and acts against the cam surface 24 of the hammer 5. As the rod 3 acts on the cam surface 24, the hammer 5 is rotated about its pivot pin 9, thus folding the tag 8 forward in the applicator jaws until the point 32 pierces the ear of the animal and locks home in the corresponding aperture 33. The cam surface 24 creates a large initial force for the hammer 5 so that the tag point 32 can pierce the animal's ear quickly. Once the tag 8 has pierced the ear, the point 32 of the tag 8 passes through the aperture 33 of the tag 8 and locks in place. At the instant that the hammer 5 completes the folding of the tag 8, a cutting blade 35 attached to a surface of the hammer 5 cuts the tag 8 away from the remaining tags across the spine 40. In this way, the tag 8 remains secured to the other tags in the magazine until the moment it is applied. The tag 8 is now attached to the animal and the animal can be released. FIG. 3(b) shows the position of the hammer 5 and push rod 3 at this point.

At the moment that the hammer 5 closes the tag and attaches the tag 8 to the animal, the push rod 3 has reached the end of the cam surface 24. As the rod 3 reaches the end of the cam surface 24, the hammer 5 springs back to its open position under the action of the torsion spring 20. As the hammer 5 springs back, the tip 3a of the push rod 3 follows the slot in the upper surface 5a of the hammer 5. As the slot is of sufficient width to allow the rod 3 to pass through, but not the lobes 23 of the rod 3, the tip 3a of the rod 3 follows the slot along the upper surface 5a as the hammer 5 returns to its open position. When the hammer 5 has returned to its open position, the tip of the push rod 3 has reached the channel 25 in the hammer 5. As the channel 25 is of sufficient width to allow the lobes 23 of the push rod 3 to pass through, the rod 3 can now pass through the slot in the upper surface 5a, as can be seen in FIG. 3(c).

As the lever 2 is pressed towards the body 1 and the rod 3 acts on the hammer 5, the actuation member 4 on the lever 2 comes into contact with the pin member 27, as seen in FIG. 4. As previously described, the resultant upward movement of the pin 27 causes the elliptical plate 16 to rotate in the anti-clockwise direction. This rotation in turn causes the ratchet member 19 to move anti-clockwise relative to the stationary gear wheel 11. As the lever 2 is returned to its initial position under the action of the volute spring 7, the striking member 4 moves away from the pin 27, and the pin falls under the action of the spring 28, rotating the elliptical plate clockwise back to its initial position. During this clockwise rotation, the ratchet member 19 acts upon a tooth of the gear wheel 11, thereby rotating the gear wheel clockwise. During this clockwise rotation, the tooth of the gear wheel 11 nearest the tags 8 enters a corresponding aperture 15 in the magazine and pushes the magazine towards the applicator jaws, thus pushing the next tag into the jaws.

As the lever 2 is released and returns to its initial position, it pulls the attached push rod 3 with it. The rod 3 is permitted to pass back through the hammer 5 to its initial position by way of the channel 26 which allows the tip 3a of the rod 3 to pass through. The resultant position is shown in FIG. 3(d). Once the components of the applicator are back in their initial positions, a new tag has been pushed into the jaws of the applicator, and the operation cycle can start again.

The above description is merely intended to describe one preferred embodiment of the present invention, and it is to be understood that variations may be made to the present invention. For example, a more simplified version of the embodiment described above may be used in which there is no gear wheel feeder mechanism. Instead, the operator would simply push the tag magazine towards the applicator after each tag application, thereby manually loading the next tag into the applicator jaws. The applicator would have a spring-loaded, tapered pin which would spring into the apertures 15 of the magazine each time the magazine is pushed to insert the next tag into the jaws, thus holding the magazine tags in place. Furthermore, the applicator may be manufactured from a variety of materials in order to reduce weight. For example, components such as the tag guide 6 and gear wheel 11 could be made from a hard-wearing plastics material instead of metal. In addition, the applicator tags used are not restricted to the specific embodiment described herein, as the applicator is also compatible with existing tags. Furthermore, it is to be understood that the applicator is not intended to be used only on animals having ears, as it may also be used to secure tags which do not pierce the skin of the animal. An example of this would be the securing of tags to the legs of birds.

One of the main advantages of the applicator described herein is that a magazine of tags may be loaded into the applicator so that the applicator can apply a number of tags without the operator having to load tags individually, as the applicator can automatically load each consecutive tag in the magazine. The applicator is also operated using only one hand, so that the other can be used to hold the animal securely. Furthermore, the arrangement of the rod 3 and the cam surface 24 of the hammer 5 create an initial acceleration of the hammer 5. This ensures a swift and powerful application of the tag, causing minimum pain to the animal. Additionally, the hammer springs back to its initial position as soon as the tag has been applied to the animal without the need to release the lever. This allows the tag and the animal to leave the applicator without any risk of damage to the animal by tearing the skin, or of the animal escaping with the applicator attached to it. In addition, the initial position of the hammer allows an unrestricted view of the animal so that accurate tag placement can be made. With the possibility of many of the components being made from lightweight yet durable plastics materials, the applicator is also sufficiently lightweight to permit operation with only one hand, which leaves the operator's other hand free for holding the animal.

These and other modifications and improvements can be incorporated without departing from the scope of the invention.

The invention claimed is:

1. An apparatus for the application of identification tags to animals, said apparatus comprising: an applicator body; tag application means including a driving surface adapted to directly engage a tag and drive the tag into a portion of the animal; delivery means adapted to deliver two or more of said tags into said tag application means; and an operating means attached to the applicator body and adapted to operate the tag application means; wherein the delivery means includes: a rotatable gear wheel having a plurality of teeth, the gear wheel adapted to effect movement of two or more tags into the tag application means; and a ratchet mechanism adapted to impart rotational movement to the gear wheel in response to operation of the operating means; and wherein the tag application means comprises first and second jaw members, wherein the first jaw member is fixed relative to said body and the second jaw member is pivotably attached to said body so as to move towards the first jaw member upon operation by the operating means, and the driving surface is provided on the second jaw member.

2. The apparatus of claim 1, wherein the operating means operates said application means and delivery means in sequence, such that a subsequent tag is delivered into the application means automatically following application of a first tag.

3. The apparatus of claim 1, further comprising guide means adapted to guide said two or more tags to a position adjacent said tag application means.

4. The apparatus of claim 3, wherein the two or more tags are interconnected, and wherein the tag application means further comprises a cutting blade adapted to separate a tag in said tag application means from the or each remaining tag in said guide means as the tag application means is operated.

5. The apparatus of claim 1, wherein said second jaw member has a cam surface adapted to be acted upon by said operating means.

6. The apparatus of claim 5, wherein the cam surface is arranged so that the initial velocity of said driving surface is greater than the final velocity of said driving surface.

7. The apparatus of claim 5, wherein said second jaw member is provided with a first biasing means which returns the second jaw member to an open position said first position from said second position when said operating means ceases to act upon said second jaw member.

8. The apparatus of claim 1, wherein said operating means includes a lever member which is pivotably attached to said body and moveable between a first position and a second position.

9. The apparatus of claim 8, wherein said lever is biased to said first position by a second biasing means connected between said lever and said body, said first position being further from said body than said second position.

* * * * *